United States Patent [19]

Kohyama et al.

[11] 4,275,494
[45] Jun. 30, 1981

[54] METHOD FOR MANUFACTURING LIQUID CRYSTAL DISPLAY ELEMENTS

[75] Inventors: Masaharu Kohyama; Tadashi Ishibashi, both of Mobara, Japan

[73] Assignee: Hitachi, Ltd., Tokyo, Japan

[21] Appl. No.: 46,026

[22] Filed: Jun. 6, 1979

[30] Foreign Application Priority Data

Jun. 30, 1978 [JP] Japan ................................ 53-78671
Nov. 1, 1978 [JP] Japan ............................... 53-133710

[51] Int. Cl.³ .............................................. G02F 1/13
[52] U.S. Cl. ................................................. 29/592 R
[58] Field of Search ................. 29/592; 156/101, 247, 156/256, 991, 257, 295, 309.6; 428/1; 225/2, 96.5

[56] References Cited

U.S. PATENT DOCUMENTS 4,094,058 6/1978 Yasutake et al. ................ 29/592 R Primary Examiner—Leon Gilden
Attorney, Agent, or Firm—Craig & Antonelli

[57] ABSTRACT

A method for manufacturing liquid crystal cells is disclosed, in which a pair of large-area glass substrates are put together, opposite to each other and spaced a small distance apart from each other, so that a plurality of liquid crystal cells are integrally formed between the glass substrates, and by splitting the glass substrate assembly, the individual cells are separated from one another. Each of the glass substrates has a plurality of regions defined on the surface thereof to serve as substrate sections for liquid crystal cell units and desired electrodes are formed on the regions. Grooves having a substantially U-shaped cross section are cut along the boundary lines bordering the respective regions on that surface of each substrate on which the desired electrodes are formed, while linear scratches are formed in the surface of the substrate opposite to the electrode-carrying surface, corresponding in position to the U-shaped grooves. The splitting operation is performed by placing the glass substrate assembly on two parallel supports and by subjecting the assembly to bending distortion with application of a pressing force. The configuration of the U-shape of the groove and the position at which the pressing force is applied is determined depending on the thickness of the glass substrate.

8 Claims, 8 Drawing Figures

METHOD FOR MANUFACTURING LIQUID CRYSTAL DISPLAY ELEMENTS

This invention relates to a method for manufacturing liquid crystal display elements, according to which a multiplicity of liquid crystal display elements are defined between two large-area glass plates disposed parallel to each other and the individual elements are obtained by separating them from one another through splitting the glass plates.

In the conventional process of fabrication, a pair of glass plates having a desired size are provided with transparent electrodes having desired patterns and the space defined between the glass plates is filled with a liquid crystal to form a single liquid crystal display element one by one. However, the recent demands for miniature-sized alphanumeric display elements such as used for digital wrist watches and table top calculators which are flooding the market cannot be satisfied by such a so-called one-at-a-time fabrication method. The necessity for the use of a large number of such elements gives rise to a need for a certain advanced method, or especially mass production fabrication methods. Namely, such as disclosed in the Japanese Patent Application Laid-Open No. 80852/77 in which a pair of large-area glass plates are prepared each of which is provided with plural sets of transparent electrodes, each set being located on the corresponding surface portions of the glass plate, a plurality of liquid crystal cells are formed at a time between the paired glass plates disposed in parallel with and in close proximity to each other, and a plurality of liquid crystal display elements are obtained at a time by splitting the glass plates into units of liquid crystal display elements. According to this mass-production fabrication method, however, one of the pair of glass plates is specified as the upper substrate for liquid crystal display elements juxtaposed in the same orientation while the other is so fabricated as to serve only as the lower substrate for the elements. Accordingly, portions of the glass plate serving as the lower substrate, i.e. marginal portions of the individual liquid crystal cell units, will have to be discarded when the integrally formed elements are split into a plurality of cell units. This lowers the utility factor of raw material for the lower substrate. Moreover, scratches are formed corresponding to predetermined split lines on the glass substrates before the splitting step and the splitting is effected along these scratches. However, since the marginal portions to be discarded usually have a very small width of, e.g. 0.5-3 mm, splitting away the marginal portion cannot always be effected exactly along the scratch, but often deviates from the split line so that some cells are damaged to decrease the yield in production.

The method of splitting a plurality of liquid crystal cells integrally fabricated into individual units is disclosed in, for example, the Japanese Patent Application Laid-Open No. 80855/77 in which before assembling a pair of large-area glass plates scratches are formed corresponding to predetermined split lines in the surface of one of the two glass plates on which surface transparent electrodes are formed (this surface is hereafter referred to as the inner surface) while after assemblage similar scratches are formed corresponding to predetermined split lines in the surface of the other glass substrate which surface is opposite to the surface of the other glass substrate with desired electrodes formed thereon (this surface with no electrode is hereafter referred to as the outer surface), and thereafter the assembly of the glass plates is split into liquid crystal cell units by the application of mechanical force to suitable points on the surface of the assembly. However, the scratches cut by, for example, a glass-cutter in the inner surface of the glass substrate may often disappear at the time of splitting because the time from the step of scratching to the step of splitting is relatively long or because a step of sealing with bonding agent under high temperatures is effected between the scratching step and splitting step. Furthermore, there arises another drawback. Namely, in the step of assembling the glass substrates, bonding agent for hermetic sealing may fill the scratches or flow over the scratches formed in the inner surface of the substrate so that the splitting of the assembly of the glass substrates cannot be carried out along the scratches or predetermined split lines, which results in failure to obtain a desired shape or a correct dimension of the liquid crystal cell unit.

Another splitting method is disclosed in, for example, the Japanese Patent Application Laid-Open No. 83245/77 in which grooves are formed, before assemblage of a pair of glass substrates in the inner surface of one of the glass substrates, this substrate is then split after assemblage by the application of a high-speed grindstone to those positions on the outer surface of the glass substrate which correspond to the grooves on the inner surface thereof, and thereafter the other glass substrate is subjected to a splitting operation. This method has a drawback that the time required for splitting is relatively long. The grooves are usually formed by a high-speed grindstone in this case and also the speed of cutting for splitting by the high-speed grindstone is at most about 1 cm/sec. Therefore, use of the high-speed grindstone both for groove forming and for splitting involves a relatively long time for splitting. The formation of the grooves in the inner surface of one of the substrates is for preventing the transparent electrodes formed on the inner surface of the other substrate from being damaged by the grindstone which might be brought in close proximity to the inner surface of the other substrate for complete cut if the grooves are not formed. Namely, the grooves formed in the inner surface of the substrate serves to exclude necessity of close proximity of the grindstone to the inner surface of the other substrate for complete cut of the substrate.

The object of this invention, which has been made to eliminate the above mentioned drawbacks inherent to the conventional method, is to provide a method for producing liquid crystal display elements, according to which a high workability can be achieved and the produced elements have very accurate dimensions.

A copending patent application Ser. No. 44,380 now U.S. Pat. No. 4,224,093 entitled "Method for Producing Liquid Crystal Display Elements," assigned to the same assignee as the present Application and filed on June 1, 1979, discloses a method for producing liquid crystal display elements, which method eliminates a conventional drawback such that the utilization factor of material is poor, observed hereinabove in view of the Japanese Patent Application Laid-Open No. 80852/77. According to the disclosed method, first regions to serve as upper substrates of individual liquid crystal cells and second regions to serve as lower substrates of the individual liquid crystal cells are alternately defined on the surface of each of two glass substrates; transparent electrodes having predetermined patterns or shape are formed on the first and second regions; and the two glass substrates which have the same configuration are brought together in such a manner that the electrode-carrying surfaces of the two substrates face each other.

This invention therefore aims to provide an improved method for splitting liquid crystal cells integrally formed between the pair of glass substrates into individual cell units.

According to this invention, there is provided a method for manufacturing liquid crystal display elements, comprising the steps of: defining, with at least one boundary line, plural regions on each of two glass substrates; forming a transparent electrode having a desired pattern on each of the plural regions; forming a closed loop of layer of bonding agent in each of selected ones of the regions on at least one of the glass substrates, the layers having a predetermined width and thickness and extending along said boundary line and the edge of said glass substrate; combining the two glass substrates together in such a manner that the regions of one substrate are opposite to the corresponding regions of the other substrate and that the two substrates are kept at a predetermined distance apart from each other; forming a glass substrate assembly by bonding the two substrates together through a heat treatment of the bodning agent; forming linear scratches in that surface of each of the substrates on which the transparent electrodes are not formed, the linear scratches corresponding in position to the boundary lines; splitting the glass substrates along the linear scratches; and filling the spaces enclosed by the glass substrates and the bonding agent layers, with liquid crystal; wherein the method further comprising, after the step of forming the electrodes, the step of forming grooves in that surface of each of said glass substrates on which the transparent electrodes are formed, along the boundary lines, each of the grooves having a predetermined width and depth and having a substantially U-shaped cross section and the bottom of the U-shape of the groove being rounded with a predetermined radius of curvature.

This invention will now be described by way of an embodiment with reference to the attached drawings in which.

The embodiment of this invention will be described in conjunction with the producing method proposed in the above-mentioned copending Application.

Figure 1:
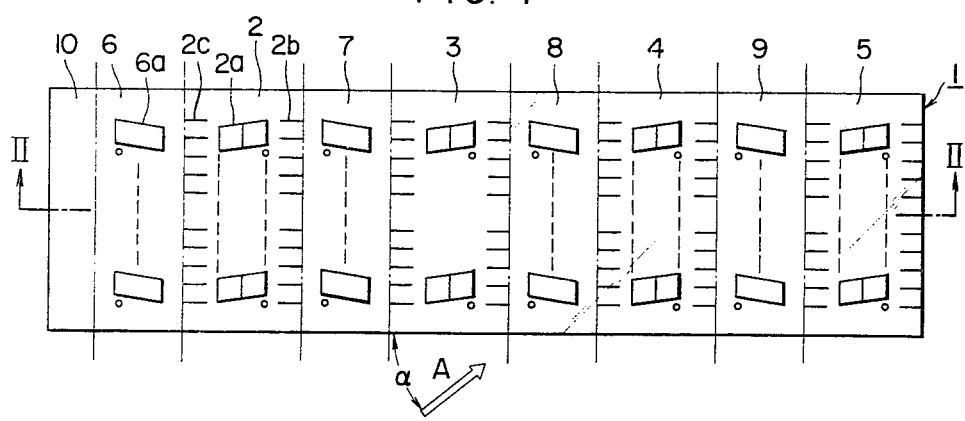
FIG. 1 is a plan view of a glass substrate with transparent electrodes formed thereon, used in an embodiment of this invention.
Figure 2:
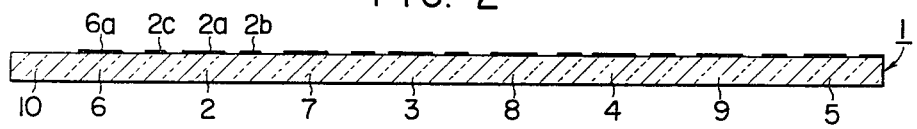
FIG. 2 is a cross sectional view taken along line II—II in FIG. 1.

In FIGS. 1 and 2, a glass substrate 1 comprises four upper substrate sections 2, 3, 4 and 5 for serving as the upper substrates of individual liquid crystal cells; four lower substrate sections 6, 7, 8 and 9 for serving as the lower substrates of the respective cells; and a marginal portion 10, the upper and lower substrate sections being alternately arranged. The boundaries between the upper and lower substrate sections and between the end portion and the lower substrate section are predetermined split lines along which the glass substrate 1 is split later. On the upper substrate section 2 are formed transparent segment electrodes 2a for constituting desired patterns and transparent terminals 2b and 2c. The segment electrodes 2a and the associated terminals 2b and 2c are connected with each other by means of conductor lines (not shown). The segment electrodes 2a and the terminals 2b and 2c are formed of transparent conductive film through, for example, photoetching technique. The same transparent segment electrodes and transparent terminals are formed also on the other upper substrate sections 3, 4 and 5. On the lower substrate section 6 are formed common electrodes 6a and conductor leads (not shown) connected with the common electrodes. The common electrodes 6a and the conductor leads are formed of transparent conductive film through photoetching technique or any other suitable method. The same common electrodes and conductor leads are formed also on the other lower substrate sections 7, 8 and 9 through the same technique. The conductor leads formed on each lower substrate section serves to connect the common electrodes with the terminals when the lower substrate section is later combined with an upper substrate section to form a liquid crystal cell. Article symbols and/or marks used for the exact registration of patterns may be introduced in the end portion 10.

A transparent protective film of, for example, $SiO_2$ is formed on the surface of the glass substrate 1 where the transparent electrodes and terminals are formed, so that the electrodes and the terminals are completely covered by the transparent protective film. In this case, the film of $SiO_2$ is formed by the oblique vapor-deposition in the direction indicated by an arrow A so as to be treated for orientating the molecules of liquid crystal in a predetermined direction in the planes parallel to the surface of the substrate 1. Such a treatment of the $SiO_2$ film for liquid crystal molecule orientation may be performed by a rubbing treatment in the direction of the arrow A after the film of $SiO_2$ has been formed.

Figure 3:
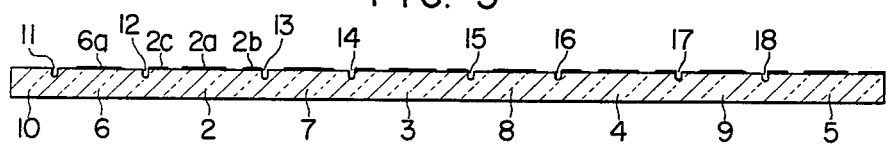
FIG. 3 is a cross sectional view similar to FIG. 2 in which grooves are formed in the surface of the substrate.

Then, as shown in FIG. 3, grooves 11–18 are formed in the surface of the glass substrate 1, along the predetermined split lines serving also as boundaries between the upper and the lower substrate sections 2 and 6, 3 and 7, 4 and 8, and 5 and 9 and between the lower substrate section 6 and the end portion 10. The grooves 11–18 are cut by a high-speed grindstone and each groove has a U-shaped cross section with a width of 0.1–0.5 mm.

The process of the above-mentioned treatment of the $SiO_2$ film may be performed after the formation of the grooves.

Figure 4:
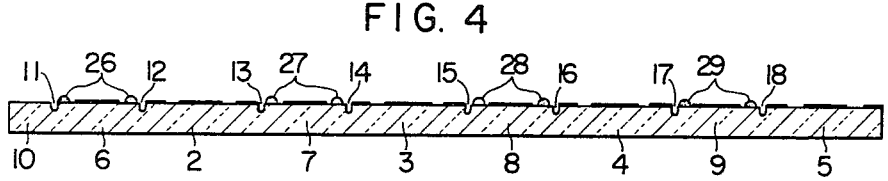
FIG. 4 is a cross sectional view similar to FIG. 2 in which layers of bonding agent are formed on the surface of the substrate.

As shown in FIG. 4, layers 26, 27, 28 and 29 of bonding agent for sealing are deposited on the lower substrate sections 6, 7, 8 and 9 of the glass substrate 1 through, for example, printing technique. Each of the bonding layers 26, 27, 28 and 29 forms a closed rectangular loop with its pair of sides parallel to the edges of the glass substrate and with its other pair of sides parallel to and spaced a predetermined distance from the split lines. In this case, the bonding agent layers must be prepared so that the layers 26, 27, 28 and 29 are spaced a distance of 0.1–1.0 mm apart from the grooves 11 and 12, 13 and 14, 15 and 16, and 17 and 18, respectively, for avoiding the bonding agent spreading beyond the corresponding grooves.

Figure 5:
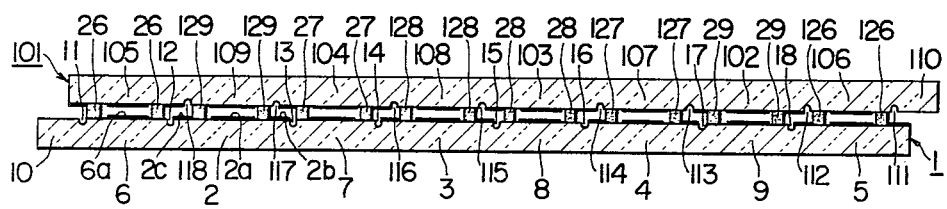
FIG. 5 shows in cross section how the substrates are assembled.

As shown in FIG. 5, another glass substrate 101 prepared through the same process as described above and having the same configuration as the substrate 1 is disposed on the glass substrate 1 with their inner surfaces (on which the transparent electrodes are formed) facing each other. The relative positions of the substrates 1 and 101 with respect to each other are such thet the segment electrodes on the upper substrate sections 2, 3, 4 and 5 of the substrate 1 may be opposite respectively to the common electrodes on the lower substrate sections 109, 108, 107 and 106 of the substrate 101, and that the common electrodes on the lower substrate sections 6, 7, 8 and 9 of the substrate 1 may be opposite respectively to the segment electrodes on the upper substrate sections 105, 104, 103 and 102 of the substrate 101. In this case, the angle between the directions of the treatments for liquid crystal molecule orientation in the substrates 1 and 101 is set equal to twice $\alpha$, e.g. 80°–100°, $\alpha$ representing the angle which the direction of the treatment in each substrate makes with respect to the substrate as shown in FIG. 1.

The glass substrates 1 and 101, put together, are subjected to heat treatment so that the bonding agent layers 26, 27, 28 and 29 and 126, 127, 128 and 129 are hardened and thermally bonded to the substrates to form a glass substrate assembly.

Figure 6:
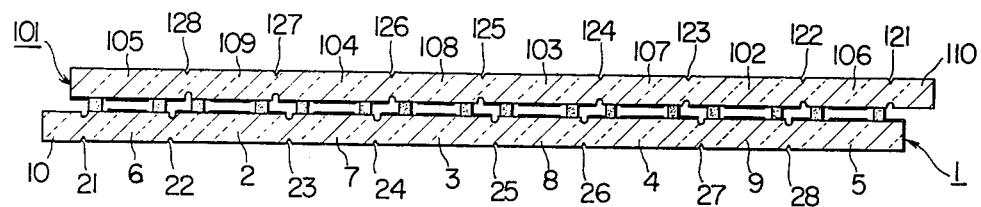
FIG. 6 shows in cross section scratches formed in the outer surfaces of the glass substrates.

As shown in FIG. 6, linear scratches 21–28 are formed in the outer surface of the glass substrate 1, at positions corresponding to the grooves 11–18, by means of, for example, a glass-cutter and linear scratches 121–128 are similarly formed in the outer surface of the glass substrate 101, at positions corresponding to the grooves 111–118.

Figure 7:
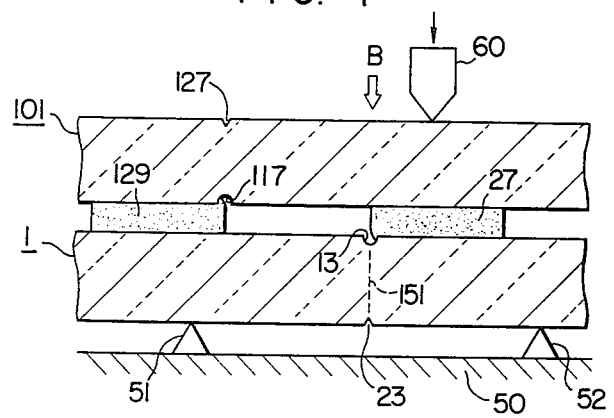
FIG. 7 shows in an enlarged scale a part of the structure shown in FIG. 6 for explaining the splitting operation.

After forming the scratches in the outer surfaces of the glass substrates 1 and 101, as shown in FIG. 7, the glass substrate assembly is placed on a supporting apparatus having a flat table 50 and supports 51 and 52 thereon, and a pressing force is applied by means of a pressing device 60 resting on the outer surface of one substrate and nearly above a set of a groove and a scratch in the other substrate. The longitudinal axes of the supports 51 and 52 are parallel to the split lines and therefore the linear scratches. In FIG. 7, there is a case where the pressing force is applied onto the outer surface of the substrate 101 near the position corresponding to the set of the groove 13 and the scratch 23. The glass substrate assembly is so placed on the supporting apparatus that the groove 13 and the scratch 23 may be located at the midpoint between the supports 51 and 52. The pressing force applied by the device 60 causes a bending distortion in the glass substrate assembly so that the substrate 1 is cut between the groove 13 and the scratch 23, as indicated by a dotted line 151. Since the groove 13 and the scratch 23 lie in a plane perpendicular to the outer surface of the glass substrate 1, the cut surface, indicated by the dotted line 151, becomes perpendicular to the outer surface of the substrate 1.

This splitting operation is continued by shifting the assembly laterally to perform the splitting along all the cut lines and the substrate 1 is split into eight sections and the end portion 10. Next, the assembly is placed on the supporting apparatus upside down and the same operation is performed to split the glass substrate 101. As a result, there are obtained eight liquid crystal cell units. The bonding agents 27 and 129 partially spread into the grooves 13 and 117 respectively, so that the sealing effect and therefore the resistivity to moisture is improved and also that the mechanical strength is enhanced.

The end portions 10 and 110 are discarded. Liquid crystal is injected into each of the separated cell units through an opening 130 provided in the bonding agent layer and a liquid crystal cell is completed by choking the opening with a bonding agent or soldering material. The glass substrates 1 and 101 are very effectively utilized since only the end portions 10 and 110 are discarded. This leads to an improved material saving and the material utility factor is much increased. This leads also to the reduction in production cost.

According to the inventors' experiments, it has been revealed that the depth of the groove must satisfy the following inequality;

$$0.1 < d < 0.6t,$$

where d designates the depth in mm of the groove and t the thickness in mm of the glass substrate.

Namely, the bonding agent layer is formed so as to have a thickness of 15–30 $\mu$m and the distance between the glass substrates 1 and 101 is about 5–15 $\mu$m in their assembly shown in FIG. 5. Therefore, when the substrates 1 and 101 are brought together to form the glass substrate assembly, the bonding agent layer is pressed and spreads partially into a part or the entirety of the groove and also beyond the groove into the adjacent cell section, if the depth d of the groove is such that d<0.1. This makes it impossible to split the substrates along the set of the groove and the scratch and hence to obtain a desired dimension of the liquid crystal cell. The rate of such a fault was as high as 40% for grooves having a depth of 0.1 mm and a width of 0.1 mm.

On the other hand, if d>0.6 t, that is, if the depth of the grooves is too great, the glass substrate assembly may sometimes be split undesirably prematurely during manufacturing process before the splitting step since cracks are generated along the grooves. The rate of such a fault was 3–15% for grooves having a depth of 0.6 mm and a width of 0.15 mm in a glass substrate of 0.1 mm thickness. The fault never occurred for grooves having a width of 0.15 mm and a depth of 0.15–0.5 mm.

It is therefore understood that the problems of the incorrect splitting and the premature splitting can be eliminated if the depth of the groove satisfies the following relation;

$$0.1 < d < 0.6t,$$

or preferably $$0.15 \leq d \leq 0.5t.$$

Moreover, in the case of grooves having a V-shaped cross section, i.e. angled bottom, and a depth of 0.3–0.4 mm, the rate of cracks being generated in the glass substrate due to the stress concentrated in the angled bottom during manufacturing process before the splitting process was as high as 80%. When the bottom of the V-shape of the groove is rounded to a certain extent, with a radius of curvature of 0.01–0.02 mm, the rate of cracks being generated was reduced down to 50%. And the rate was 30% for the groove having a substantially U-shaped cross section by rounding the bottom of the V-shape with a radius of curvature of about 0.05 mm. Cracks were never generated when the radius of curvature for rounding the bottom of the V-shape was 0.075 mm.

It has therefore been revealed from the above experiments that undesirable cracks can be prevented from being generated prematurely in the grooves if the groove has a substantially U-shaped cross section having a rounded bottom with a radius of curvature of more than 0.05 mm, or preferably more than 0.075 mm.

Figure 8:
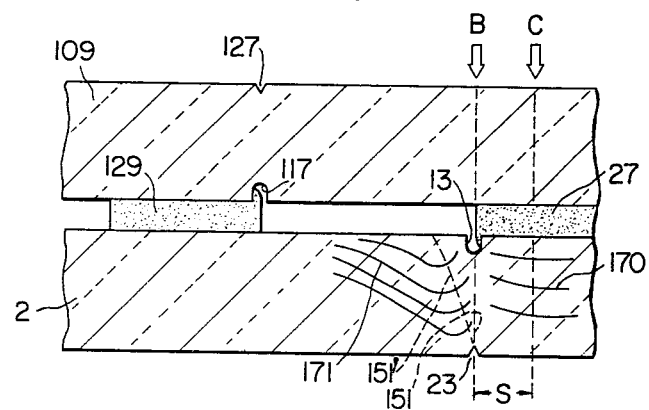
FIG. 8 shows in an enlarged scale a part of the structure shown in FIG. 6 for explaining a position at which a pressing force is applied at the splitting operation.

When the pressing force is applied by the pressure device 60 resting on the position indicated by an arrow B, corresponding in position to the groove 13 and the scratch 23, a crack develops along a dotted line 151' shown in FIG. 8 deviating from the proper cut line 151 so that the substrate is erroneously split.

This mechanism of crack development is as follows. The thermal expansion coefficient of the bonding agent is usually greater than that of the glass substrate and therefore a residual strain left in the glass substrate varies depending on the position in the glass substrate; that is, the residual strain 170 generated in the substrate 1 beneath the bonding agent layer 27 is relatively small while the residual strain 171 caused in the substrate 1 beneath the surface thereof where the bonding agent layer is not formed is relatively large. Since a crack tends to develop crosswise to the residual strain, the glass substrate 1 is to be split, when the pressing force is applied, along the dotted line 151' in the region where there is the relatively large strain.

The inventors have found, after repeated experiments, that the glass substrate 1 can be split along the desired cut line 151 by applying the pressing force not at the position indicated by the arrow B, corresponding in position to the groove 13 and the scratch 23, but at the position indicated by the arrow C which is deviated from the position indicated by the arrow B toward the bonding agent layer 27. This is because the strain generated by the pressing force applied at the point of arrow C is superposed upon the residual one in the substrate 1 to give rise to a strain substantially symmetrical with respect to the dotted line 151, as recognized through measurement with a strain gauge. The experiments have also showed that a requirement for attaining the proper splitting of the substrate 1 along the dotted line 151 is such that $$1.0t \leq S \leq 3.0t,$$

where S is the distance in mm between the position of arrow B and the position of arrow C and t is the thickness in mm of the glass substrates 1 and 101. Specifically, when $S = 1.5\ t - 2.5\ t$, there arose no crack along the dotted line 151'. The unevenness of the dimensions due to this splitting method showed a normal distribution, and the yield of cells having a dimensional precision within ±0.15 mm amounted to 99.8% while those with a precision within ±0.1 mm was 97.8%.

It will be easily understood from the above explanation that the above method of splitting the substrate along the line 151 by applying the pressing force at the position of arrow C can be successfully extended to the case where no groove is formed in the inner surface of the substrate.

It is also apparent that although in this specification the embodiment of this invention is described in conjunction with the production method proposed in the above-mentioned copending Patent Application, this invention is by no means limited in application such a proposed method, but can be successfully applied also to, for example, the production method disclosed in the Japanese Patent Application Laid-Open No. 80852/77.

In addition, this invention can also be applied to various display elements such as electrochromic elements which resemble liquid crystal display elements and have a smaller inter-substrate space and therefore are suitable in application to a flat panel display.

We claim:

1. A method for manufacturing liquid crystal display elements, comprising the steps of:
   defining, with at least one boundary line, plural regions on each of two glass substrates;
   forming a transparent electrode having a desired pattern on each of said plural regions;
   forming a closed loop of layer of bonding agent in each of selected ones of said regions on at least one of said glass substrates, said layers having a predetermined width and thickness and extending along said boundary line and the edge of said glass substrate;
   combining said two glass substrates together in such a manner that said regions of one substrate are opposite to the corresponding regions of the other substrate and that said two substrates are kept at a predetermined distance apart from each other;
   forming a glass substrate assembly by bonding said two substrates together through a heat treatment of said bonding agent;
   forming linear scratches in that surface of each of said substrates on which said transparent electrodes are not formed, said linear scratches corresponding in position to said boundary lines;
   splitting said glass substrates along said linear scratches; and
   filling the spaces enclosed by said glass substrates and said bonding agent layers, with liquid crystal;
   wherein said method further comprising, after the step of forming the electrodes, the step of forming grooves in that surface of each of said glass substrates on which said transparent electrodes are formed, along said boundary lines, each of said grooves having a predetermined width and depth and having a substantially U-shaped cross section and the bottom of the U-shape of said groove being rounded with a predetermined radius of curvature.

2. A method as claimed in claim 1, wherein the depth d in mm of said U-shaped groove satisfies the following relation:

$$0.1 < d < 0.6t,$$

where t designates the thickness of said glass substrate in mm.

3. A method as claimed in claim 2, wherein said depth d of said U-shaped groove satisfies the following relation:

$$0.15 < d < 0.5t.$$

4. A method as claimed in claim 1, wherein said radius of curvature is not less that 0.05 mm.

5. A method as claimed in claim 4, wherein said radius of curvature is not less than 0.075 mm.

6. A method as claimed in claim 1, 2, 3, 4 or 5, wherein said step of splitting comprises the step of placing said glass substrate assembly on a supporting apparatus having two support members spaced a predetermined distance apart from each other and disposed substantially parallel with said linear scratches, in such a manner that a scratch in the surface of said assembly facing said supporting apparatus is positioned at the midpoint between said support members and the step of bending said assembly by applying a pressing force to the surface of said assembly not facing said supporting apparatus.

7. A method as claimed in claim 6, wherein the position at which the pressing force is applied is apart from said scratch positioned at said midpoint at a predetermined distance in the direction along the surface of said substrate, said distance S in mm satisfying the following relation with respect to the thickness t in mm of said glass substrate:

$$1.0t \leq S \leq 3.0t.$$

8. A method as claimed in claim 7, wherein said distance S satisfies the following relation:

$$1.5t \leq S \leq 2.5t.$$

* * * * *